(12) United States Patent
Roussel et al.

(10) Patent No.: US 7,661,735 B2
(45) Date of Patent: Feb. 16, 2010

(54) ASSEMBLY CONSISTING OF A BUMPER SKIN AND OF A SHOCK ABSORBER

(75) Inventors: Thierry Roussel, Fayl la Foret (FR); Pierre Montanvert, Villeurbanne (FR); Arnold Fayt, Jujurieux (FR); Stéphane Malteste, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 67 days.

(21) Appl. No.: 11/919,490

(22) PCT Filed: May 2, 2006

(86) PCT No.: PCT/FR2006/000985

§ 371 (c)(1),
(2), (4) Date: Jan. 8, 2008

(87) PCT Pub. No.: WO2006/117477

PCT Pub. Date: Nov. 9, 2006

(65) Prior Publication Data

US 2009/0200810 A1    Aug. 13, 2009

(30) Foreign Application Priority Data

Apr. 29, 2005   (FR) .................................. 05 04391

(51) Int. Cl.
*B60R 19/18* (2006.01)

(52) U.S. Cl. ...................................... 293/120

(58) Field of Classification Search .......... 293/120–122
See application file for complete search history.

(56) References Cited

U.S. PATENT DOCUMENTS

| | | | |
|---|---|---|---|
| 3,794,997 A | 2/1974 | Iwatsuki et al. | |
| 4,154,469 A * | 5/1979 | Goupy et al. ................. | 293/120 |
| 4,348,042 A | 9/1982 | Scrivo | |
| 5,988,713 A | 11/1999 | Okamura et al. | |
| 6,848,730 B2 * | 2/2005 | Evans ......................... | 293/121 |
| 2004/0021329 A1 * | 2/2004 | Evans ......................... | 293/120 |
| 2004/0080167 A1 | 4/2004 | Malteste et al. | |
| 2004/0262931 A1 | 12/2004 | Roussel et al. | |

FOREIGN PATENT DOCUMENTS

| | | |
|---|---|---|
| DE | 103 30 313 A1 | 1/2005 |
| EP | 0 591 031 A1 | 4/1994 |
| FR | 2 762 563 A1 | 10/1998 |
| FR | 2 836 434 A1 | 8/2003 |
| WO | WO 03/104030 A2 | 12/2003 |

\* cited by examiner

*Primary Examiner*—Dennis H Pedder
(74) *Attorney, Agent, or Firm*—Oliff & Berridge, PLC

(57) ABSTRACT

The invention relates to an assembly comprising a vehicle bumper skin and a channel-section bumper impact absorber, the absorber being made of thermoplastic material and comprising a web and two flanges, each having a free longitudinal edge and an opposite longitudinal edge that is connected to the web, the flanges and the web defining a longitudinal channel, in which the bumper skin and absorber are connected together in such a manner that the concave side of the absorber faces towards the bumper skin.

16 Claims, 3 Drawing Sheets

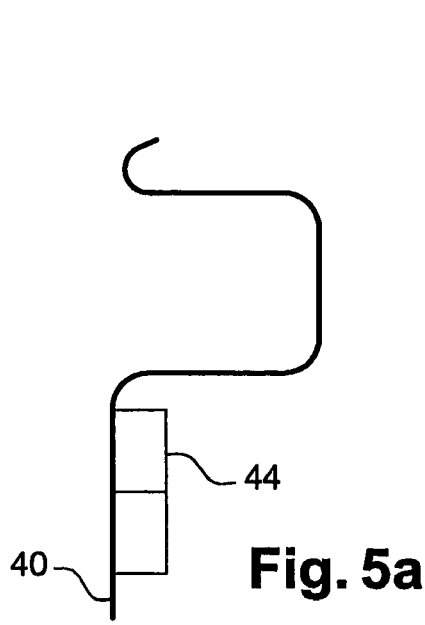
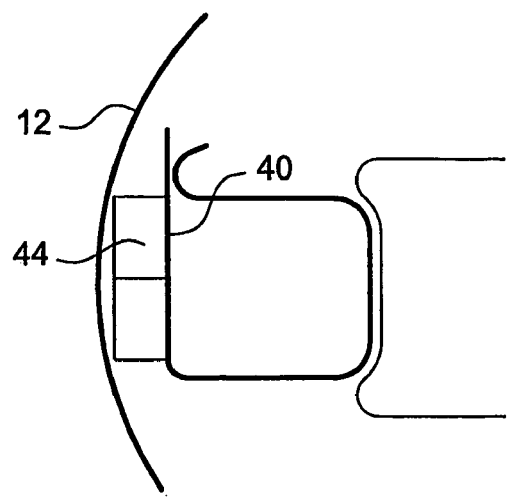
Fig. 5a  Fig. 5b
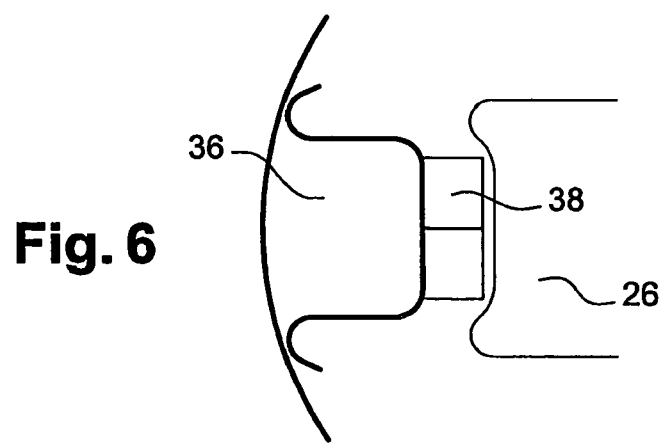
Fig. 6
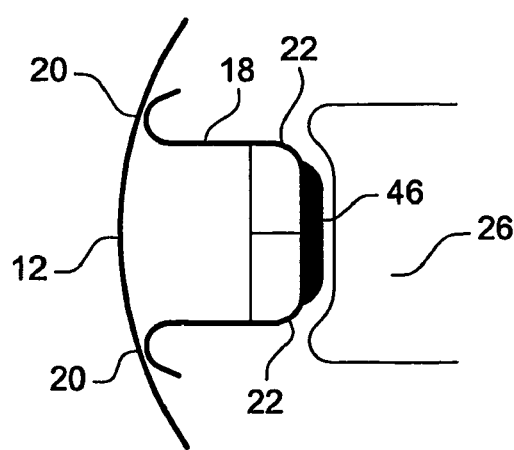
Fig. 7

ASSEMBLY CONSISTING OF A BUMPER SKIN AND OF A SHOCK ABSORBER

The present invention relates to an assembly of a bumper skin and a channel-section absorber, and to such a channel-section absorber.

TECHNICAL FIELD

In a motor vehicle bumper, it is common to use an absorber that is interposed between an impact beam and a bumper skin. The function of the absorber is to protect pedestrians in the event of an impact by preventing the pedestrian encountering a hard surface. Thanks to the presence of the absorber, the bumper skin is not in direct contact with the impact beam. Thus, the deformation of the absorber serves to absorb low-speed impacts with pedestrians.

STATE OF THE ART

An assembly of a motor vehicle bumper skin and a thermoplastic material channel-section absorber is known in the state of the art, the absorber comprising a web and two flanges, each having a free longitudinal edge and an opposite longitudinal edge that is connected to the web, the flanges and the web defining a longitudinal channel. The absorber is of oblong shape and the web and the flanges extend lengthwise relative to the absorber. Once mounted on a vehicle, the longitudinal direction of the absorber is substantially orthogonal to the travel direction of the vehicle.

The absorber is fastened, e.g. by click-fastening, to the impact beam by being oriented in such a manner that its concave side faces towards the beam. Often, the absorber is fastened to the beam via its free edges. The bumper skin covers the absorber and the impact beam.

In particular, an impact beam is known that includes longitudinal grooves formed in its surface, the grooves being suitable for receiving the free edges of the flanges. It is therefore necessary to adapt the shape of the beam so that it can be effective in supporting the absorber.

Problem Posed by that State of the Art

The means for fastening the free edges of the flanges of the absorber to the impact beam need to be particularly strong in order to withstand impacts. Often, it is necessary to modify the structure of the impact beam and to give it a shape that is complex and thus The invention seeks to overcome the above-mentioned problems by providing an assembly of a skin and an absorber for co-operating with an impact beam and that is simple in design and to fabricate.

Technical Solution Proposed by the Invention

To this end, the invention provides an assembly of a vehicle bumper skin and a channel-section bumper absorber, the absorber being made of thermoplastic material and comprising a web and two flanges, each having a free longitudinal edge and an opposite longitudinal edge that is connected to the web, the flanges and the web defining a longitudinal channel, the assembly being characterized in that the bumper skin and absorber are interconnected so that the concave side of the absorber faces towards the bumper skin, and in that the absorber includes mechanical means for keeping the distance between the respective free edges of the two flanges substantially constant.

The term "channel" designates an empty volume forming a hollow body. The longitudinal channel defined by the flanges and the web thus constitutes a hollow body extending along the entire length of the beam.

Advantages Provided by the Invention

Thanks to the invention, there is no need to provide the impact beam with specific fastener means for the absorber. The absorber is fastened to the bumper skin, e.g. by click-fastening, but it is not fastened to the beam. Once the skin and absorber assembly is mounted on the vehicle, the web of the absorber merely bears against the impact beam. It is thus possible to use a conventional impact beam or a beam that is slightly modified so as to present a bearing surface designed to support the bottom of the absorber. Thus, in the event of an impact, the forces to which the bumper skin is subjected are transmitted to the impact beam via the absorber.

Furthermore, the assembly of the skin and the absorber can be preassembled and the assembly can subsequently be mounted on the vehicle. Mounting the assembly on the vehicle amounts merely to mounting the bumper skin on the vehicle bodywork, with no specific operation being required to put the absorber properly into position relative to the impact beam.

In addition, pedestrian impacts are absorbed by this configuration in a manner that is just as effective as in the past. In the event of an impact, the mechanical means indeed prevent the free ends of the flanges of the absorber from splaying apart from each other, which would have the effect of reducing its capacity to absorb impacts.

Optional Characteristics

An assembly of the invention may further include one or more of the following characteristics.

The mechanical means comprise at least one bridge of material integrally molded with the absorber.

The absorber is suitable for flattening by at least one of its flanges buckling under the effect of an impact. The above-defined mechanical means encourage the flanges to buckle over their entire width and prevent them from merely bending about the edge connected to the web. Thus, the entire flange contributes to absorbing impacts. In the event of an impact that is very violent, the flanges buckle completely so that the skin comes into contact with the impact beam.

The absorber is shaped so that in the event of an impact, the flanges buckle by splaying apart from each other. It is advantageous for the flanges, on buckling, not to impede flattening of the absorber. The flattening stroke of the absorber is directly associated with its capacity to absorb impacts.

The absorber includes stiffener means suitable, in the event of an impact, for ensuring that the extent to which the absorber can flatten is limited to a predetermined maximum amplitude. Thus, in the event of a violent impact, the skin is prevented from coming directly into contact with the impact beam. By dimensioning the stiffeners means appropriately, it is possible to define the maximum amplitude of the deformation to which the absorber is subjected.

The stiffener means are arranged in the channel in such a manner that the predetermined maximum amplitude is substantially the same over the entire length of the absorber. Thus., during an impact of the bumper against the obstacle, the capacity of the absorber to damp the impact is independent of the impact zone.

The stiffener means comprise an array of ribs.

The array of ribs is integrally molded with the absorber.

The stiffener means are disposed in the longitudinal channel of the absorber.

The web of the absorber is designed to bear against a bearing surface of an impact beam, the web of the absorber being shaped so as to form a bearing surface complementary to the bearing surface of the impact beam. This makes it possible to maximize the contact area between the absorber and the impact beam.

The stiffener means are located on the web of the channel.

The connected edge of each flange is substantially rectilinear and the free edge of each flange presents curvature substantially identical to the curvature of the bumper-skin, such that each flange is wider in its middle than at its longitudinal ends, and in which the distance between the stiffener means and the bumper skin is the same all along the absorber. Thus, it is possible to fit an assembly of the invention on a standard rectilinear impact beam, regardless of the curvature the bumper skin and while conserving impact-damping capacity that is uniform along the bumper.

The stiffener means are disposed outside the longitudinal channel of the absorber.

The absorber includes at least one strip of thermoplastic material integrally molded therewith and designed to close the longitudinal channel at least in part. The strip may thus act as the mechanical means for keeping the distance between the respective free edges of the two flanges substantially constant.

The stiffener means are disposed on the strip.

The invention also provides a channel-section absorber for an assembly as defined above.

The invention can be better understood on reading the following description given purely by way of example and made with reference to the accompanying figures.

BRIEF DESCRIPTION OF THE DRAWINGS

FIGS. 5a and 5b are diagrams of a second variant of an assembly of the invention.

FIG. 6 is a diagram of a third variant of an assembly of the invention.

FIG. 7 is a diagram of a fourth variant of an assembly of the invention.

MAIN EMBODIMENT OF THE INVENTION

Figure 1:
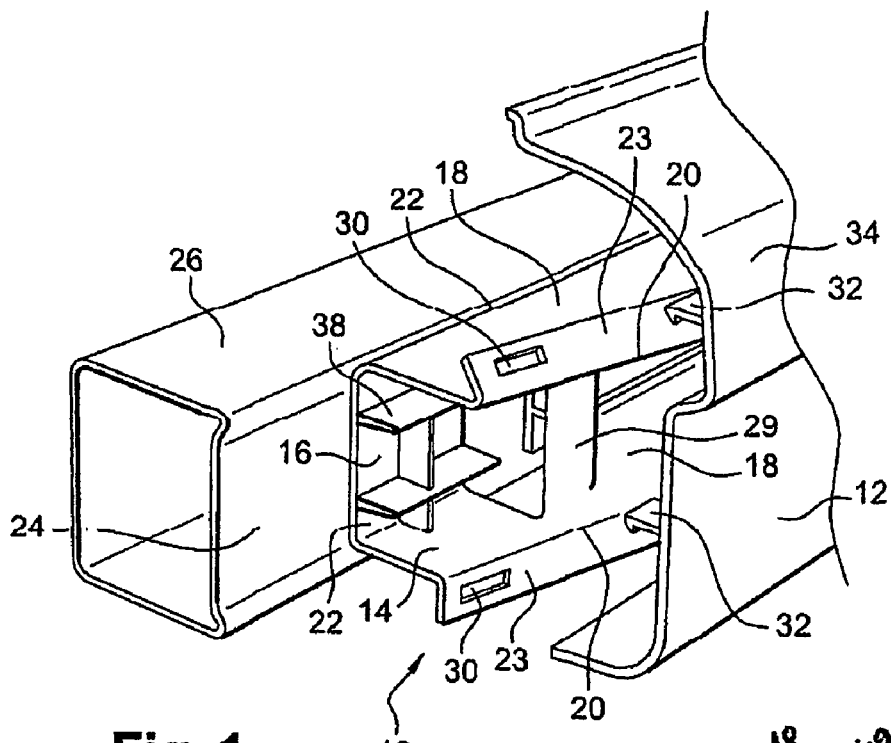
FIG. 1 is an exploded perspective view of an assembly of the invention mounted on a bumper beam.

FIG. 1 is an exploded view of an assembly 10 comprising a vehicle bumper skin 12 and a channel-section bumper impact absorber 14. The absorber 14 and the skin 12 are made of thermoplastic material.

The absorber 14 is said to be of channel section since, in cross-section, it is substantially U-shaped. The absorber 14 comprises a web 16 and two flanges 18, each having a free edge 20 and an opposite edge 22 that is connected to the web 16. The free edges 20 have longitudinal rims 23 extending substantially parallel to the web 16.

The absorber 14 and bumper skin 12 are connected together so that the concave side of the absorber faces towards the skin 12, and so that the rims 23 on the free edges 20 of the flanges 18 of the absorber bear against the skin 12 in the event of an impact. For this purpose, the absorber 14 is fastened to the bumper skin 12 by the rims 23 of the free edges 20 of the flanges 18.

Figure 3:
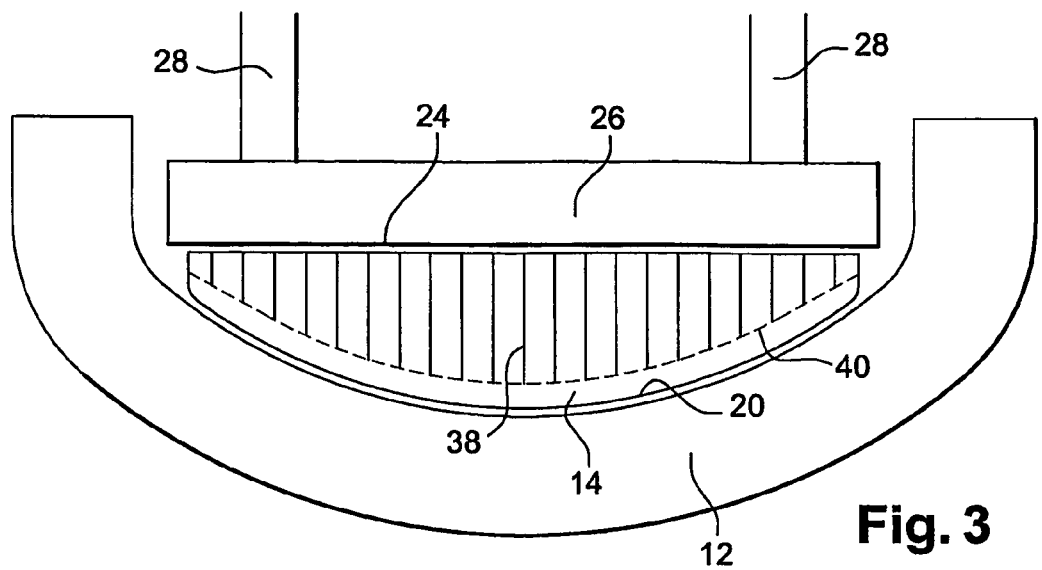
FIG. 3 is a diagrammatic horizontal longitudinal section of the assembly shown in FIG. 1.

The web 16 bears against a bearing surface 24 of an impact beam 26 connected to two side rails 28 of the vehicle, as shown in FIG. 3.

The beam 26 is substantially rectilinear and the bearing surface 24 presents a recentering shape that can be seen in FIG. 1.

The web 16 of the absorber 14 is shaped in such a manner as to form a bearing surface that is complementary to the bearing surface 24 of the beam 26. In the example shown, the web 16 is flat and consequently the connected edges 22 of the flanges 18 are substantially rectilinear.

thanks the recentering shape of the bearing surface 24 of the beam 26, the web 16 of the absorber is guided vertically towards the center of the bearing surface 24.

The free edges 20 of the flanges 18 present a curvature that is substantially identical to that of the bumper skin 12. Thus, the flange 18 is wider in its middle than at its longitudinal ends.

The absorber 14 includes mechanical means 29 for keeping the distance between the respective free edges 20 of the two flanges 18 substantially constant. These mechanical means 29 comprise bridges of thermoplastic material molded with the absorber 14.

The rims 23 on the free edges 20 of the absorber 14 are provided with slots 30 for co-operating with tongues 32 molded with the skin 12. The slots 30 and the tongues 32 enable the absorber 14 to be fastened to the skin 12 by click-fastening.

Preferably, the tongues 32 are positioned at locations on the inside surface of the skin 12 where the corresponding outside surface is masked, e.g. by a capping strip 34 or a number plate (not shown). This makes it possible to ensure that any shrinkage due to molding is not visible on the outside surface of the skin 12.

The flanges 18 and the web 16 define a longitudinal channel 36 having stiffener means 38 disposed on the web thereof and comprising an array of ribs 38 integrally molded with the absorber. In the example shown, the ribs 38 are disposed transversely or longitudinally relative to the absorber 14, but it is clear that it would equally be possible for these ribs to be disposed in a single direction only.

The flanges 18 of the absorber are thus held apart at a constant distance via their connected edges, by means of the web 16 and possibly also by means of the array of ribs 38, and at the free edges of the flanges 18 with the help of the mechanical means 29.

Between these two edges, the flanges 18 have respective free portions extending width-wise in which they can buckle, i.e. portions extending in a direction that is orthogonal to the longitudinal direction defined by the absorber. These free portions are of dimensions that are sufficiently large to enable the flanges to flatten by buckling under the effect of an impact.

Figure 2A:
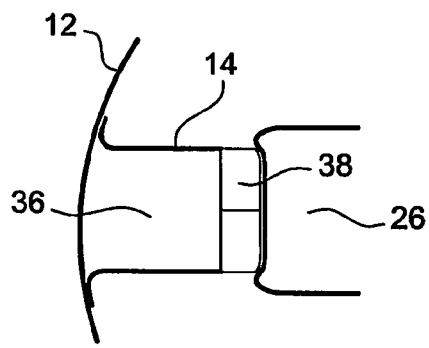
FIGS. 2a, 2b, and 2c are diagrammatic cross-sections of the assembly shown in FIG. 1 during an impact.
Figure 2B:
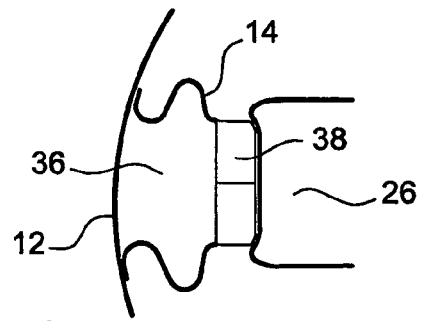
Figure 2C:
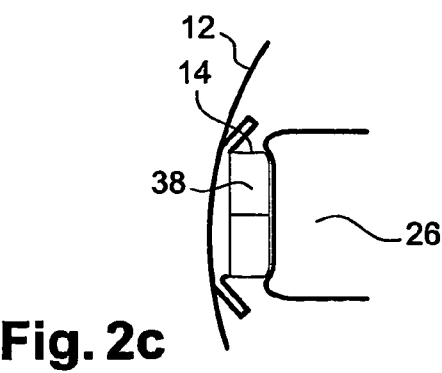

The sequence of deformations to which the assembly 10 is subjected during an impact is shown in FIGS. 2a, 2b, and 2c.

FIG. 2a shows the assembly 10 at rest.

FIG. 2b shows the assembly 10 during an impact of low intensity, e.g. during an impact with the leg of a pedestrian. It can be seen that the absorber 14 is suitable for flattening by at least one of its flanges 18 buckling under the effect of the impact. The flange buckles across its width, i.e. in a direction that is orthogonal to the longitudinal direction defined by the absorber. In other words, when the absorber is in position on a vehicle, buckling takes place in the travel direction of the vehicle.

FIG. 2c shows the assembly 10 during an impact of large intensity. It can be seen that the ribs 38 are suitable, during an impact of large intensity, for limiting the flattening of the absorber to some predetermined maximum amplitude. The skin 12 then comes into contact with the ribs 38. For a given width of flange 18 at rest, it is possible to set accurately the value of the maximum amplitude of deformation by acting on the height of the ribs 38, so as to obtain the best compromise between flattening stroke and capacity to absorb impacts.

As specified above, the flange 18 is wider in its middle than at its longitudinal ends, and the capacity of the absorber to absorb can consequently be greater in its center than at its ends. In order to ensure that the behavior of the absorber 14 is uniform during an impact, it is advantageous for the ribs 38 to be arranged in the channel 36 in such a manner that the predetermined maximum amplitude is substantially the same over the entire length of the absorber.

Thus, as shown in FIG. 3, the extent of a rib 38 is a function of its longitudinal position, such that the distance between the top of a rib and the free edge 20 of the absorber 14 remains the same for all of the ribs, e.g. equal to 50 millimeters (mm). It is recalled that this distance corresponds to the above-mentioned predetermined maximum amplitude.

The curve 40 defined by the ends of the ribs 38 present curvature that is substantially identical to that of the bumper skin 12.

The invention is not limited to the embodiment described above.

Variants of the Invention

Figure 4C:
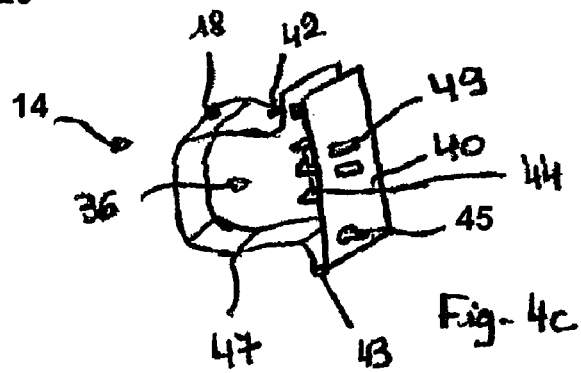
FIG. 4c is a perspective view of a segment cut from the same assembly.
Figure 4A:
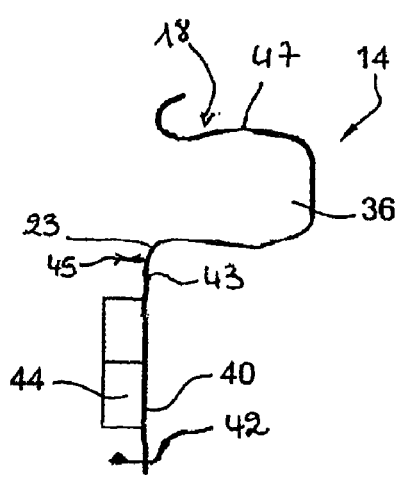
FIGS. 4a and 4b are diagrams of a first variant of an assembly of the invention.
Figure 4B:
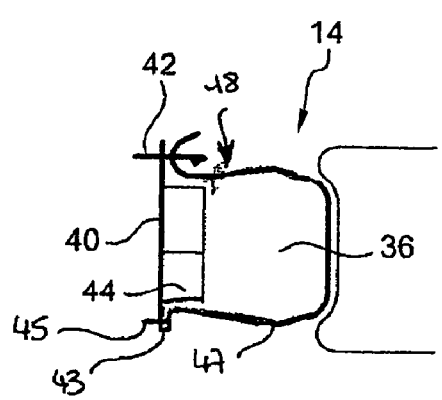

In a variant of the invention shown in FIGS. 4a, 4b, and 4c, the absorber 14 includes a strip 40 of thermoplastic material integrally molded with the absorber, and connected thereto via the rim 23 of one of the flanges of the absorber 14, which thus forms a hinge 43.

As shown in FIG. 4b, the strip 40 of material is suitable for closing the channel 36 by being folded along the connection hinge 43. The strip 40 thus folds over the rim 23, thereby strengthening the connection between the strip 40 and the flanges of the absorber 14.

In this figure, it can also be seen that the rim 23 to which the strip 40 is connected includes a stud 45 for engaging in an associated slot in the strip 40 of thermoplastic material (slot not shown in the figure).

The stud 45 ensures that the strip 40 is properly positioned relative to the flanges 18, to further strengthen the connection between the strip 40 and the absorber 14, and to prevent the strip 40 from sliding relative to the flanges 18 in the longitudinal direction of the absorber.

The strip 40 is then held in a closed position by click-fastener means 42 provided on the strip and on the other flange 18 of the absorber 14 opposite from the flange to which the strip 40 is connected. These click-fastener means may be constituted, for example, by a slot in the flange 18 of the absorber and a tongue shaped on the strip 40.

The strip 40 forms mechanical means for keeping the distance between the respective free edges of the two flanges substantially constant. In this embodiment, the flanges 18 of the absorber are not plane. They present a change in slope 47 across their width, such that buckling is facilitated, in particular by the flanges 18 splaying apart.

An array of ribs 44 is molded integrally on the surface of the strip 40 so that when the strip 40 closes the channel 36, the array of ribs 44 is located in the mouth of the channel 36 and constitutes stiffener means suitable, in the event of an impact, for limiting the flattening of the absorber to a predetermined maximum amplitude.

Naturally, in order to take into account the curvature of the free edges 20 of the flanges, it may be necessary to provide the absorber with a plurality of strips 40 of thermoplastic material disposed longitudinally one after another.

It is also possible to fasten the bumper skin 12 to said strip 40 of thermoplastic material, in particular by click-fastening, by providing at least one slot 49 in the strip 40, as shown-in FIG. 4c, in which it is possible to click a tongue molded integrally with the bumper skin, and in particular a tongue located behind the number plate.

The strip 40 gives greater freedom of choice for the location of the tongue on the bumper skin, since a greater dimension in the Z direction of the motor vehicle is available for positioning the orifice associated with the tongue.

There is thus no need to redesign the outside configuration of the bumper skin in order to avoid problems associated with shrinkage due to adding a tongue thereto. In this embodiment, it is possible for the tongues to be placed behind already existing style lines.

It should be observed that the strip 40 may also be extended, in particular in the region of the absorber that is not situated behind the number plate, so as to be suitable for being fastened at locations of the vehicle that are further away from the absorber, so as to make it possible to mask the fastening of the absorber to the skin.

In a second variant shown in FIGS. 5a and 5b, the strip 40 is connected to one of the flanges 18 along its free edge 20 which thus forms a hinge. In this embodiment, the array of ribs 44 is fastened to the strip 40 so that when the strip 40 closes the channel 36, the array of ribs lies outside the channel, thus, the skin 12 is fastened to the array of ribs 44.

In this variant, the free and connected edges of the absorber are substantially rectilinear. The array of ribs has a plane rear face connected to the strip 40, and a front face in contact with the bumper skin and of longitudinal curvature that is substantially identical to that of the skin.

In a third variant shown in FIG. 6, the array of ribs 38 is integrally molded with the web 16 of the absorber 14, outside the channel 36. The array of ribs is thus disposed between the web 16 and the bumper beam 26.

In this variant, the array of ribs has a plane rear face in contact with the bumper beam and a front face of longitudinal curvature substantially equal to that of the skin. Consequently, the web 16 and the free edges of the absorber likewise have longitudinal curvature that is substantially equal to that of the skin.

In a fourth variant shown in FIG. 7, the absorber 14 is shaped so that during an impact the flanges buckle apart from each other. For this purpose, the web 16 of the absorber locally includes extra thickness 46 that does not extend as far as the connected edges 22. Thus, when the absorber is positioned on the vehicle, only the extra thickness 46 is in contact with the bumper beam 26.

In the event of an impact, the skin 12 transmits the forces to the flanges 18 via the free edges 20. Given that the flanges are not in direct contact with the beam, because of the extra thickness 26, the flanges then tend to open up and splay apart from each other.

The same result can also be obtained by shaping the flanges appropriately, for example by giving them respective longitudinal setbacks or by connecting them to the web 16 at a slightly flared angle.

Finally, although in all of the variants described, the absorber is made as a single piece, it is possible for it to be built up from a plurality of longitudinal segments that are interconnected, e.g. two segments of equal length.

The invention claimed is:

1. The assembly of a vehicle bumper skin and a channel-section bumper absorber, the absorber being made of thermoplastic material and comprising:
   a web; and
   two flanges each having a free longitudinal edge and an opposite longitudinal edge that are connected to the web, the flanges and the web defining a longitudinal channel that forms an empty volume extending alone an entire length of the absorber, wherein:
   the bumper skin and absorber are interconnected so that a concave side of the absorber faces towards the bumper skin, and
   the absorber includes a mechanical means for keeping a distance between the respective free edges of the two flanges substantially constant, the mechanical means being situated in such a manner that the longitudinal channel is between the mechanical means and the web of the absorber.

2. The assembly according to claim 1, in which the absorber is suitable for flattening by at least one of its flanges buckling under the effect of an impact.

3. The assembly according to claim 2, in which the absorber is shaped so that in the event of an impact, the flanges buckle by splaying apart from each other.

4. The assembly according to claim 2, in which the absorber includes a stiffener means suitable for ensuring that, in the event of an impact, when the absorber has flattened until the absorber reaches a predetermined amplitude, a rigidity of the absorber increases.

5. The assembly according to claim 4, in which the stiffener means are arranged in such a manner that the predetermined amplitude is substantially the same over the entire length of the absorber.

6. The assembly according to claim 4, in which the stiffener means comprise an array of ribs.

7. The assembly according to claim 6, in which the array of ribs is integrally molded with the absorber.

8. The assembly according to claim 4, in which the stiffener means are disposed in the longitudinal channel of the absorber.

9. An assembly according to claim 8, in which the web of the absorber is designed to bear against a bearing surface of an impact beam, the web of the absorber being shaped so as to form a bearing surface complementary to the bearing surface of the impact beam.

10. The assembly according to claim 8, in which the stiffener means are located on the web of the channel.

11. The assembly according to claim 5, in which the stiffeners means are located on the web of the channel, wherein the connected edge of each flange is substantially rectilinear and the free edge of each flange presents curvature substantially identical to the curvature of the bumper skin such that each flange is wider in its middle than at its longitudinal ends, and in which the distance between the stiffener means and the bumper skin is the same all along the absorber.

12. The assembly according to claim 4, in which the stiffener means are disposed outside the longitudinal channel of the absorber.

13. The assembly according to claim 1, in which the mechanical means comprise at least one bridge of material integrally molded with the absorber.

14. The assembly according to claim 1, in which the absorber includes at least one strip of thermoplastic material integrally molded therewith and designed to close the longitudinal channel at least in part.

15. The assembly according to claim 5, in which the absorber includes at least one strip of thermoplastic material integrally molded therewith and designed to close the longitudinal channel at least in part, wherein the stiffener means are disposed on the strip.

16. Absorber for a vehicle, wherein the absorber is a channel-section bumper absorber made of thermoplastic material and comprising:
   a web; and
   two flanges each having a free longitudinal edge and an opposite longitudinal edge that are connected to the web, the flanges and the web defining a longitudinal channel forming an empty volume extending along an entire length of the absorber, wherein:
   the absorber comprising fixing elements to interconnect the absorber and a bumper skin so that a concave side of the absorber faces toward the bumper skin;
   the absorber includes a mechanical means for keeping a distance between the respective free edges of the two flanges substantially constant so that the absorber is suitable for flattening by at least one of the absorber's flanges buckling under the effect of an impact, the mechanical means being situated in such a manner that the longitudinal channel is in between the mechanical means and the web of the absorber; and the absorber further includes a stiffener means suitable for ensuring that, in the event of an impact, when the absorber has flattened until the absorber reaches a predetermined amplitude, a rigidity of the absorber increases, the stiffener means being arranged in such a manner that the predetermined amplitude is substantially the same over the entire length of the absorber.

* * * * *

UNITED STATES PATENT AND TRADEMARK OFFICE
CERTIFICATE OF CORRECTION

PATENT NO. : 7,661,735 B2  Page 1 of 1
APPLICATION NO. : 11/919490
DATED : February 16, 2010
INVENTOR(S) : Thierry Roussel et al.

It is certified that error appears in the above-identified patent and that said Letters Patent is hereby corrected as shown below:

Column 7

Claim 1, line 17, change "alone" to -- along --.

Signed and Sealed this

First Day of June, 2010

David J. Kappos
*Director of the United States Patent and Trademark Office*